(12) United States Patent
Mizutani

(10) Patent No.: US 8,027,059 B2
(45) Date of Patent: Sep. 27, 2011

(54) IMAGE PROCESSING DEVICE

(75) Inventor: Shunsuke Mizutani, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 841 days.

(21) Appl. No.: 11/961,022

(22) Filed: Dec. 20, 2007

(65) Prior Publication Data
US 2009/0161172 A1 Jun. 25, 2009

(30) Foreign Application Priority Data

Dec. 20, 2006 (JP) .................................. 2006-342981

(51) Int. Cl.
*H04N 1/40* (2006.01)
(52) U.S. Cl. ........................................ 358/1.9; 358/504
(58) Field of Classification Search .................. 358/1.9, 358/2.1, 3.21–3.22, 500, 504; 382/168, 172
See application file for complete search history.

(56) References Cited

U.S. PATENT DOCUMENTS

| | | | |
|---|---|---|---|
| 6,222,642 B1 | 4/2001 | Farrell et al. | |
| 6,690,011 B2 * | 2/2004 | Watanabe et al. | 250/330 |
| 6,868,189 B1 | 3/2005 | Hoshino | |
| 6,917,707 B1 | 7/2005 | Kubota | |
| 6,952,285 B1 | 10/2005 | Naka | |
| 6,961,460 B2 | 11/2005 | Nagai et al. | |
| 7,340,092 B2 * | 3/2008 | Tanaka et al. | 382/170 |
| 2003/0012437 A1 | 1/2003 | Zaklika et al. | |
| 2004/0197021 A1 | 10/2004 | Huang et al. | |

(Continued)

FOREIGN PATENT DOCUMENTS

EP 0187911 A2 7/1986

(Continued)

OTHER PUBLICATIONS

Japanese Patent Office, Office Action for Japanese Application No. 2006-342981, mailing date Nov. 18, 2008.

(Continued)

*Primary Examiner* — Thomas D Lee
*Assistant Examiner* — Stephen Brinich
(74) *Attorney, Agent, or Firm* — Baker Botts L.L.P.

(57) ABSTRACT

An image processing device has a main unit, a storage unit, a first processing unit, a second processing unit, a first determination unit, and a first replacement unit. The storage unit is provided in the main unit that stores a color image having ground color and different color from the ground color, the color image being formed by color-pixels including a ground color pixel and a different color pixel, the ground color pixel having the ground color, the different color pixel having the different color. The first processing unit scales down the color image to produce a first gray-scale image which is simply represented by brightness having a plurality of brightness values, the first gray-scale image being formed by first gray-scale pixels. The second processing unit determines the brightness value of each of the color pixels to produce a histogram showing a distribution of the color pixels with respect to the brightness. The first determination unit determines a first threshold level based on the histogram to distinguish the ground color pixel from the different color pixel. The first replacement unit compares the brightness value of at least one of the color pixels with the first threshold level to detect the ground color pixel, the first replacement unit replacing the detected ground color pixel with a white color pixel to produce a processed color image, the white color pixel having white color.

13 Claims, 9 Drawing Sheets

U.S. PATENT DOCUMENTS

| | | | |
|---|---|---|---|
| 2005/0078879 A1 | 4/2005 | Sakurai et al. | |
| 2005/0244072 A1 | 11/2005 | Imai | |

FOREIGN PATENT DOCUMENTS

| | | | |
|---|---|---|---|
| EP | 1826720 A1 | 8/2007 |
| JP | 55145486 A | 11/1980 |
| JP | 600007262 A | 1/1985 |
| JP | 4362850 A | 12/1992 |
| JP | 9181888 A | 7/1997 |
| JP | 200036909 A | 2/2000 |
| JP | 2000244735 A | 9/2000 |
| JP | 2001-103309 A | 4/2001 |
| JP | 200194781 A | 4/2001 |
| JP | 2001101437 A | 4/2001 |
| JP | 2001-245177 A | 9/2001 |
| JP | 2001312001 A | 11/2001 |
| JP | 2004-304635 A | 10/2004 |
| JP | 2005-122319 A | 5/2005 |
| JP | 2005-122323 A | 5/2005 |
| JP | 2005-260657 A | 9/2005 |
| JP | 2005295490 A | 10/2005 |
| JP | 2006121488 A | 5/2006 |
| WO | 2006052097 A1 | 5/2006 |

OTHER PUBLICATIONS

European Patent Office, European Search Report for EP Application No. 07254976 dated Mar. 20, 2008.

* cited by examiner

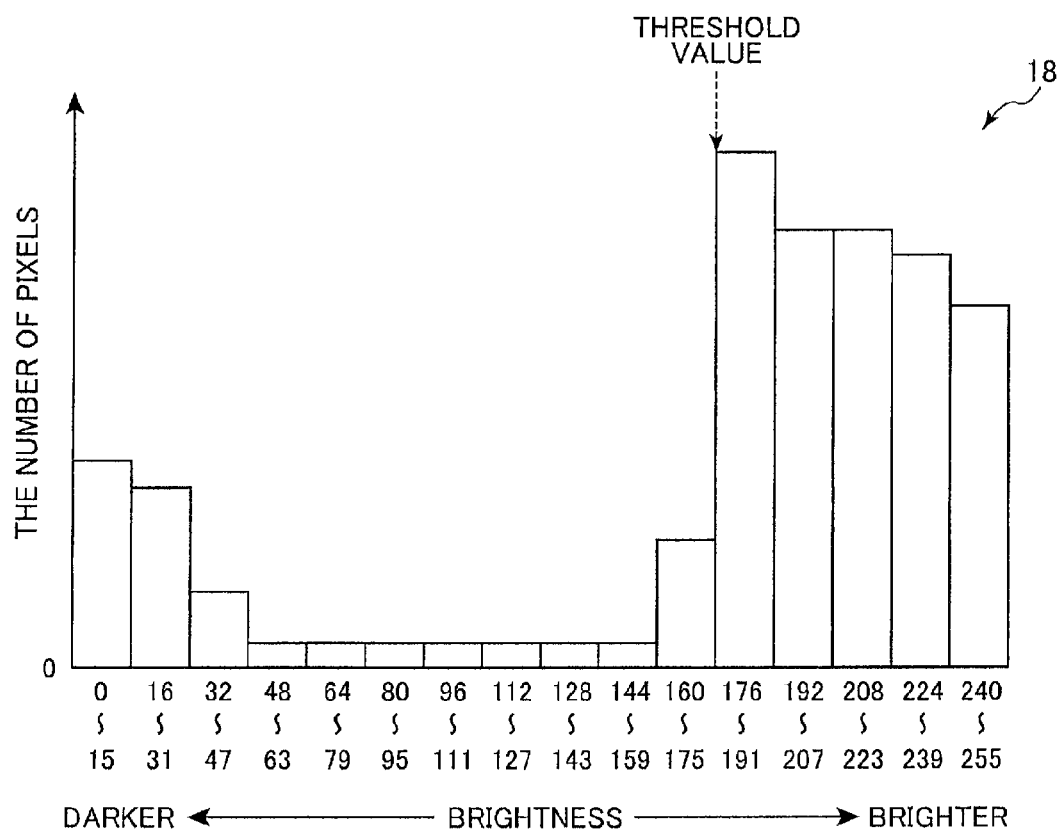

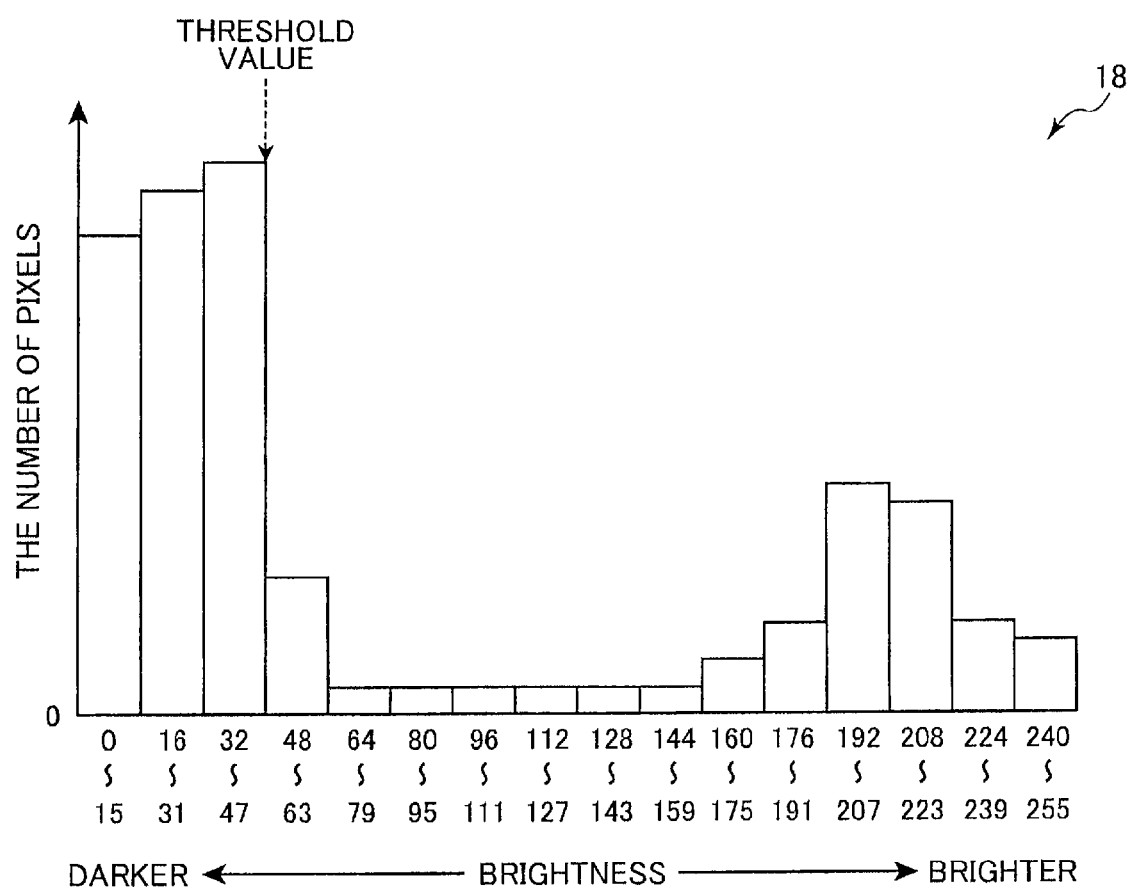

IMAGE PROCESSING DEVICE

CROSS REFERENCE TO RELATED APPLICATIONS

This application claims priority from Japanese Patent Application No. 2006-342981 filed Dec. 20, 2006. The entire content of the priority application is incorporated herein by reference.

TECHNICAL FIELD

The present invention relates to an image processing device which corrects a color image.

BACKGROUND

In recent years, in order to record characters and/or a graphic written on a whiteboard or a blackboard as electronic data, a digital camera or a camera phone is sometimes utilized. Japanese Patent Application Publication No. 2006-121488 discloses a printer which processes color data obtained by taking a photograph with a digital camera. The printer reduces the number of gradation values of a color image inputted to the printer. This is because the inputted color image is originally provided with a large number of gradation values. As a result, a color image data of a smaller size is generated. Small-sized data is suitable for data transfer by e-mail or wireless communication.

Japanese Patent Application Publication No. 2000-36909 discloses an electronic blackboard which scans an image on a screen. The screen is included in the electronic blackboard. The read mage is then recorded on a recording sheet. In order to stabilize the quality of the image to be recorded, regardless of light source intensity and the density of the original image, the electronic blackboard can change a threshold value used for image reading.

Furthermore, Japanese Patent Application Publication No. 4-362850 discloses a color separator which color-separates the image obtained by reading an original image put on a white screen. The screen is included in the electronic blackboard. The color separator obtains monochrome image data by reading characters and/or a graphic written/formed in black and red on the screen. The color separator uses a monochrome image sensor represented by pixels having a brightness value in the range of 0 to 255 (256 values of gradation). The color separator determines the brightness value of each pixel to create a brightness histogram showing the relation between brightness value and the number of pixels at each brightness value. Based on the pixel distribution shown in the density histogram, the color separator achieves separation among the following colors of pixels: black, white, and red.

If the color image is obtained by photographing a whiteboard, the color image contains pixels having the ground color of the whiteboard. Since dust or dirt adheres to the surface of the whiteboard, the pixels which have the ground color do not represent perfect white. In order to print the color image, therefore, additional ink or toner is required for the ground color. On the other hand, if a color image is obtained by photographing a blackboard, since the ground of the blackboard has a color near black, a large amount of toner or ink is consumed for printing the color image. The problem is that, ink or toner is wastefully consumed for the ground color of an image, although the ground color is not significant information.

In addition, the color image printed on a recording sheet is disadvantageous. Such an image sometimes cannot obtain a printed result having a good visibility, due to dust or dirt adhering to the surface of the whiteboard or the blackboard.

SUMMARY

It is an object of the present invention to provide an image processing device which ensures quality of printing a color image with an increased visibility, while reducing the amount of ink or toner to be consumed for printing the color image.

The present invention provides an image processing device having a storage unit, a first processing unit, a second processing unit, a first determination unit, and a first replacement unit. The storage unit stores a color image having ground color and different color from the ground color, the color image being formed by color-pixels including a ground color pixel and a different color pixel, the ground color pixel having the ground color, the different color pixel having the different color. The first processing unit scales down the color image to produce a first gray-scale image which is simply represented by brightness having a plurality of brightness values, the first gray-scale image being formed by first gray-scale pixels. The second processing unit determines the brightness value of each of the color pixels to produce a histogram showing a distribution of the color pixels with respect to the brightness. The first determination unit determines a first threshold level based on the histogram to distinguish the ground color pixel from the different color pixel. The first replacement unit compares the brightness value of at least one of the color pixels with the first threshold level to detect the ground color pixel, the first replacement unit replacing the detected ground color pixel with a white color pixel to produce a processed color image, the white color pixel having white color.

The present invention provides an image-forming apparatus having the image processing device and a print unit that prints the color image processed by the image processing device.

The present invention provides a storage medium storing a set of program instructions executable on a data processing device and usable for print. Instructions includes storing a color image having ground color and different color from the ground color, the color image being formed by color pixels including a ground color pixel and a different color pixel, the ground color pixel having the ground color, the different color pixel having the different color; scaling down the color image to produce a first gray-scale image which is simply represented by brightness having a plurality of brightness values, the first gray-scale image being formed by first gray-scale pixels; determining the brightness value of each of the color pixels to produce a histogram showing a distribution of the color pixels with respect to the brightness; determining a first threshold level according to the histogram to distinguish the ground color pixel from the different color pixel; and comparing the brightness value of at least one of the color pixels with the first threshold level to detect the ground color pixel, and replacing the detected ground color pixel with a white color pixel to produce a processed color image, the white color pixel having white color.

The present invention provides a method for processing a color image having ground color and different color from the ground color, the color image being formed by color pixels including a ground color pixel and a different color pixel, the ground color pixel having the ground color, the different color pixel having the different color. The method includes storing the color image; scaling down the color image to produce a first gray-scale image which is simply represented by brightness having a plurality of brightness values, the first gray-scale image being formed by first gray-scale pixels; determining the brightness value of each of the color pixels to produce a histogram showing a distribution of the color pixels with respect to the brightness; determining a first threshold level according to the histogram to distinguish the ground color pixel from the different color pixel; and comparing the brightness value of at least one of the color pixels with the first threshold level to detect the ground color pixel, and replacing the detected ground color pixel with a white color pixel to produce a processed color image, the white color pixel having white color.

BRIEF DESCRIPTION OF THE DRAWINGS

The particular features and advantages of the invention as well as other objects will become apparent from the following description taken in connection with the accompanying drawings, in which:

FIG. 6 shows a histogram showing brightness values of the color image on a whiteboard;

FIG. 7 shows a histogram showing brightness values of the color image on a blackboard;

DETAILED DESCRIPTION

Hereinafter, an embodiment of the present invention will be described with reference to the accompanying drawings.

Figure 1:
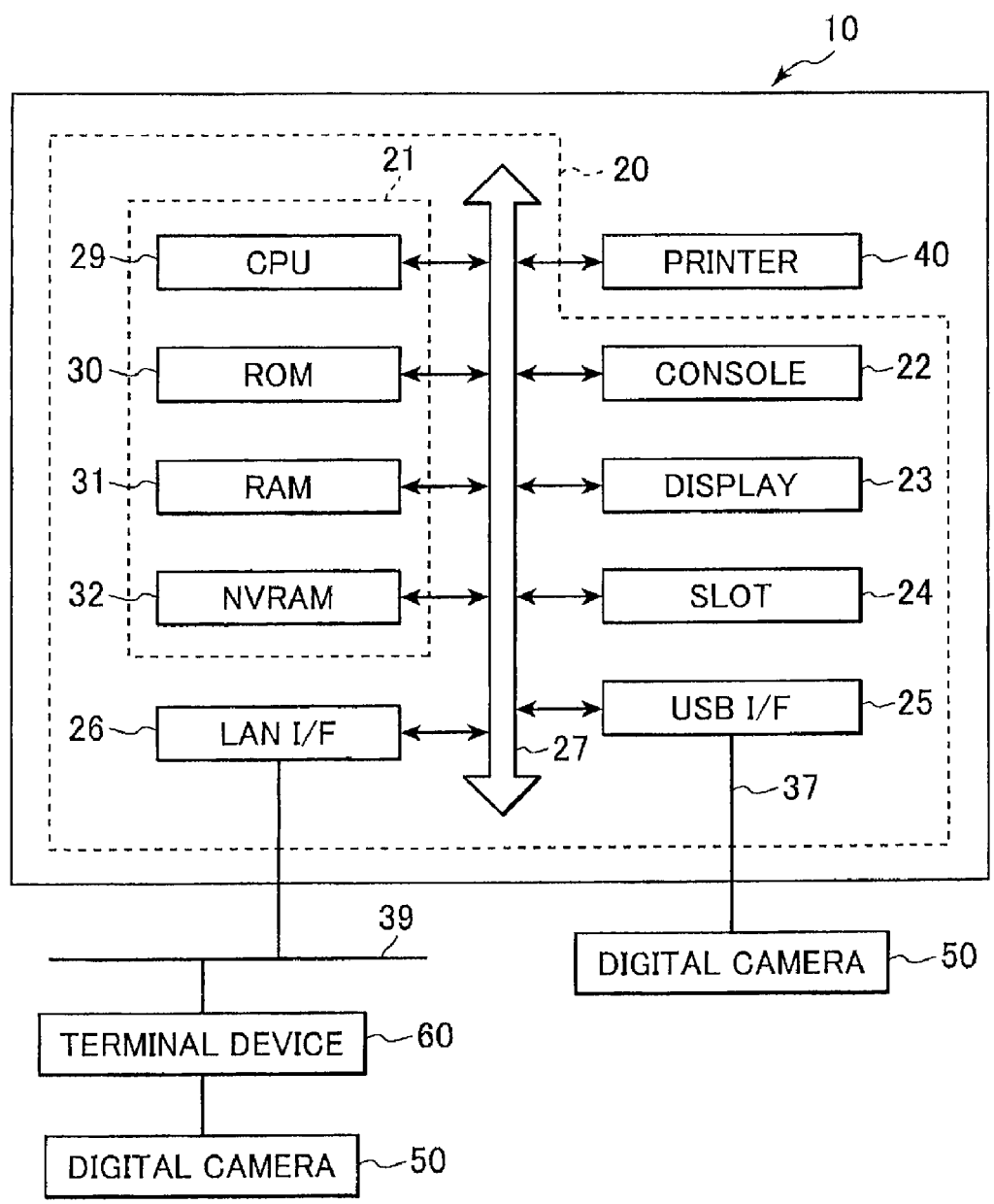
FIG. 1 is a block diagram showing a network printer.

Referring to FIG. 1, the network printer 10 includes an image processing unit 20 and a printer unit 40. The image processing unit 20 includes a control unit 21 made by a computer. The image processing unit 20 corrects a color image (color image data) 12 inputted thereto (see FIG. 2). In the embodiment, the color image 12 is obtained by photographing a writing medium, using a digital camera 50. Characters or a graphic have been written on the writing medium. The writing medium, although not limited to a specific kind, a whiteboard and a blackboard are employed in the embodiment. The color image 12 is corrected so that the ground color of the writing medium contained in the color image 12 is changed to white color. A whiteboard becomes soiled by dust or dirt. This means that the ground color of the whiteboard is not purely white. If a whiteboard is employed in the embodiment, the ground color of the whiteboard contained in the color image 12 is changed to the white color by the image processing unit 20. On the other hand, a blackboard has a dark green ground color. If a blackboard is employed in the embodiment, the ground color of the blackboard contained in the color image 12 is changed to the white color by the image processing unit 20. The printer unit 40 prints the corrected image 16 (see FIG. 2), i.e., the color image 12 corrected by the image processing unit 20 on a recording sheet.

As shown in FIG. 1, the network printer 10 is operationally connected to the digital camera 50 via a Universal Serial Bus (USB) cable 37. The network printer 10 is also operationally connected to a terminal device 60 via a local area network (LAN) 39. The terminal device 60, for example, is a personal computer. Although only one terminal device 60 is connected to the printer 10 in FIG. 1 for convenience, a plurality of terminal devices 60 may be connected to the printer 10.

The digital camera 50 digitizes the image of an object and then stores the digitized image in the digital camera 50. The digital camera 50 converts incident light to electric signals using an image sensor such as CCD or CMOS. The digital camera 50 then stores the electric signals as the color image 12. The color image 12 is stored in a Joint Photographic Experts Group (JPEG) image file format in the embodiment. However, the present invention is not limited to the JPEG format. A Bitmap (BMP) format and a Graphics Interchange Format (GIF) format may also be employed. The whiteboard or the blackboard on which characters or a graphic has been written is photographed by the digital camera 50. This operation enables the color image 12 to be stored in a small memory card (not shown) included in the digital camera 50.

The digital camera 50 is operationally connected to the image processing unit 20 via the USB cable 37. Through this connection, the color image 12 is transferred from the memory card to the image processing unit 20. Note that the color image 12 does not necessarily have to be transferred directly from the digital camera 50 to the image processing unit 20. If the digital camera 50 is connected to the terminal device 60, the color image 12 may be first transferred from the digital camera 50 to the terminal device 60. In this case, the color image 12 is then transferred from the terminal device 60 to the image processing unit 20 via the LAN 39. Alternatively, if the processing unit 20 has a slot 24 for accepting the memory card storing the color image 12, the color image 12 may be transferred from the memory card to the processing unit 20 through the slot 24.

The control unit 21 controls the network printer 10 as a whole. As shown in FIG. 1, the control unit 21 is a microcomputer including a central processing unit (CPU) 29, a read-only memory (ROM) 30, a random-access memory (RAM) 31, and a nonvolatile random-access memory (NVRAM) 32 in the casing (not shown) which is assembled in the printer 10. The control unit 21 is operationally connected to a console unit 22, a display unit 23, the slot 24, a Universal Serial Bus interface (USB I/F) 25, a local area network interface (LAN I/F) 26, and the printer unit 40 via a bus 27. Note that the network printer 10 is not limited to the configuration shown in FIG. 1. Changes may be made in the configuration as required without departing from the spirit and scope of the present invention.

The CPU 29 controls each component included in the network printer 10 according to an image processing program stored in the ROM 30. The RAM 31 serves as the main memory and a work area for the CPU 29. The RAM 31 stores various kinds of setting information. The color image 12 which has been transferred to the network printer 10 is stored in the RAM 31 (see FIG. 2). The NVRAM 32 stores various kinds of setting data for the network printer 10 so as to maintain the setting data even after the network printer 10 is powered off.

The printer unit 40 prints the corrected image 16 on a recording sheet. The corrected image 16 is obtained by correcting the color image 12. In the embodiment, a laser printer is employed as the printer unit 40. In the laser printer, a semiconductor laser (LD: Laser Diode) is employed as a light source used for forming an electrostatic latent image on the surface of a photoreceptor drum by optical writing. The printer unit 40 uses the following four colors of toner to record the corrected image 16 on a recording sheet: cyan (C), magenta (M), yellow (Y), and black (K). Note that the printer unit 40 is not limited to a laser printer. For example, a liquid crystal display (LED) printer and an inkjet printer may also be employed.

The console unit 22 includes input keys and a touch panel. The user enters information from the keys and the panel to the printer 10. The network printer 10 operates in response to the instruction which has been entered from the console unit 22. The network printer 10 also operates in response to the instruction which has been transmitted from the terminal device 60. The console unit 22 enables the user to select one of an auto-determination mode, a whiteboard mode, and a blackboard mode. These modes will be described later in detail.

Figure 9:
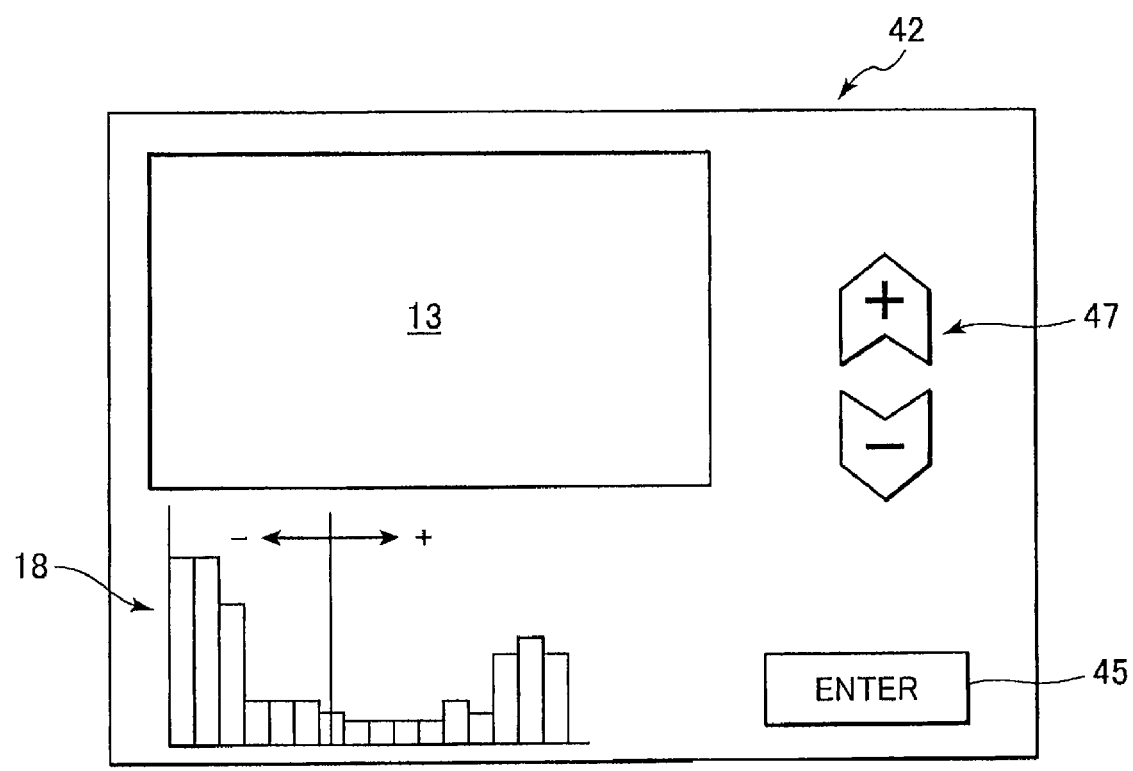
FIG. 9 is a schematic diagram showing a screen of the network printer.

Referring to FIG. 9, change keys 47 and an enter key 45 are provided on the touch panel of the console unit 22. The change keys 47 and the enter key 45 are displayed on a screen 42. The screen 42 becomes available on the display unit 23 after the console unit 22 accepts the mode selection. The change keys 47 are provided to change a first threshold value and to enter a second threshold value. The first threshold value has been set by the control unit 21. The first and second threshold values are used for distinguishing a pixel having a ground color of the color image 12 on the writing medium from a pixel having a color other than the ground color. Generally, the first threshold value is determined according to a method described later. The second threshold value is manually determined by the user. The pixel having the ground color is designated as "a ground-color pixel." The change keys 47 is used for switching between the first threshold value and the second threshold value, while the user is looking at the screen 42. The enter key 45 is used for confirming one of the first threshold value and the second threshold value to be entered.

The display unit 23 includes an LED panel and an LED lamp. The display unit 23 displays the setting information and the operating state of the network printer 10.

The slot 24 is able to receive various types of small memory cards. The USB I/F 25 operationally connects the digital camera 50 with the network printer 10 via the USB cable 37. The color image 12 stored in the digital camera 50 is transferred through the USB I/F 25 to the network printer 10. Note that the color image 12 may be transferred to the network printer 10 by radio communication (using infrared rays). The LAN I/F 26 operationally connects the LAN 39 with the network printer 10. Note that the network printer 10 may be operationally connected to the terminal device 60 through a printer port instead of the LAN I/F 26.

Figure 2:
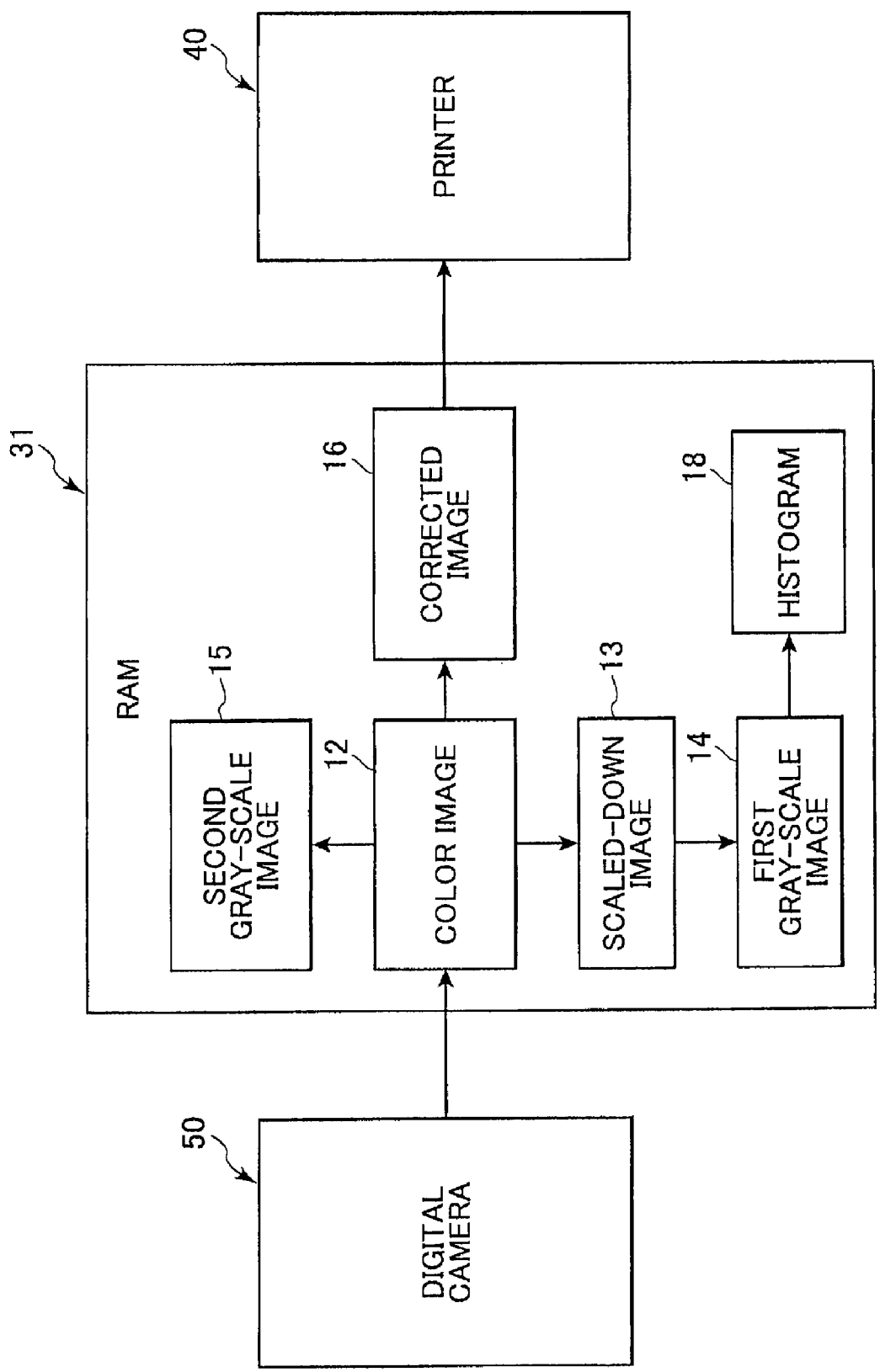
FIG. 2 is a block diagram showing a data stored in a RAM.

As shown in FIG. 2, the RAM 31 stores the color image 12 transferred from the digital camera 50. The color image 12 is formed in the RGB color system. The RGB color system works on the basic principle that each color is a composition of the three color components: red (R), green (G), and blue (B). The color image 12 has RGB values for each pixel. RGB means the three primary colors of light: Red, Green, and Blue. Various colors are obtained by mixing of the three primary colors. Therefore, the color of each pixel contained in the color image 12 is represented as a combination of RGB values. In the embodiment, each of the RGB components is given as a value in the range of 0 to 255 (256 levels of gray). Each pixel becomes brighter as the pixel's RGB values become larger. Each pixel becomes darker as the pixel's RGB values become smaller. For example, the pure white color has RGB values of 255, 255, 255. On the other hand, the perfect black color has RGB values of 0, 0, 0. Based on the color image 12, the control unit 21 generates a scaled-down image 13, a first gray-scale image 14, a second gray-scale image 15, a histogram 18, and the corrected image 16 (to be described later).

Hereinafter, a description is given for an image processing method which is employed by the network printer 10 according to the embodiment.

Figure 3:
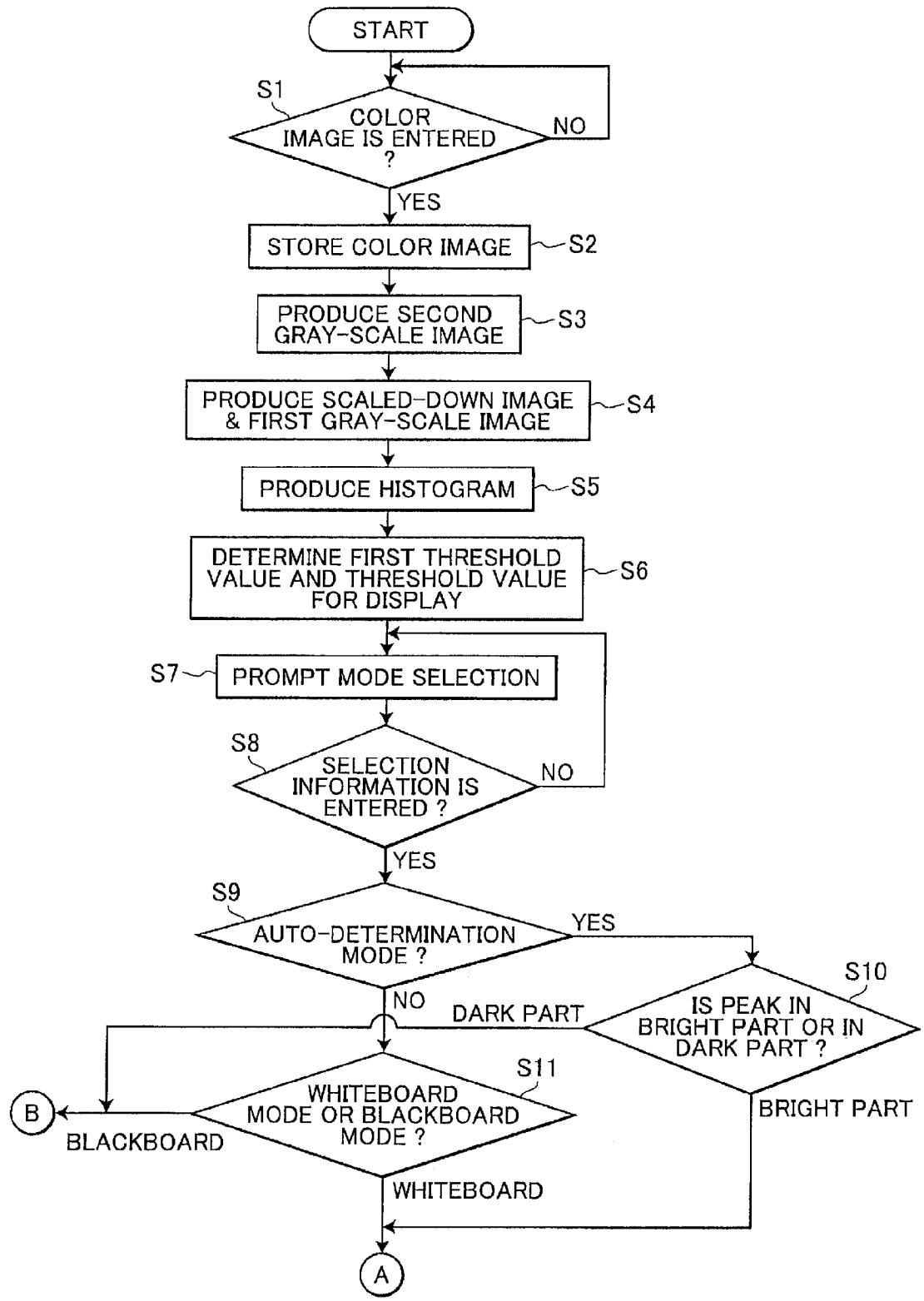
FIGS. 3, 4, and 5 are flowcharts showing a process to process a color image data in the network printer.
Figure 4:
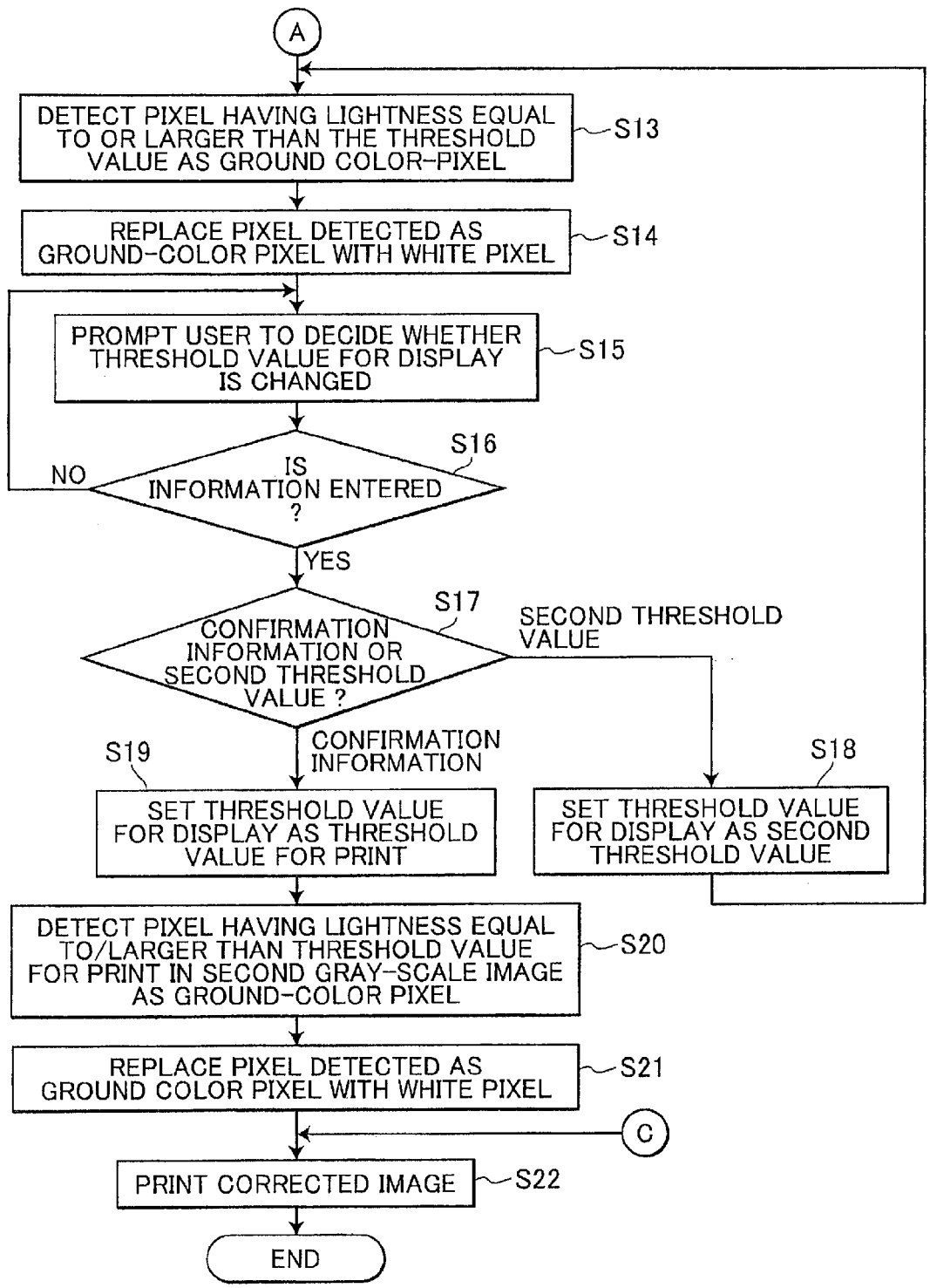
Figure 5:
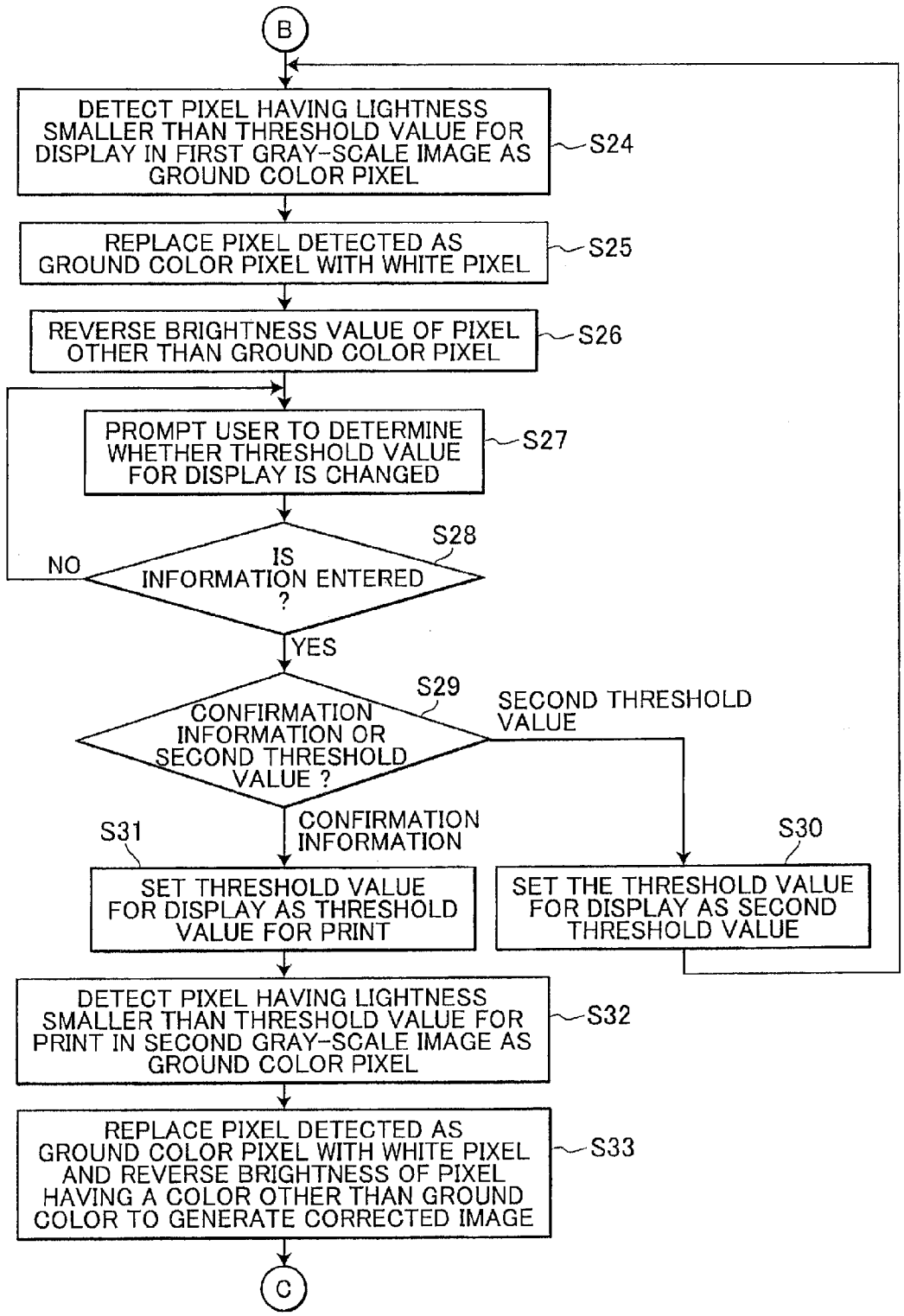

FIGS. 3 to 5 are flowcharts showing a process to be performed in the network printer 10 when the color image 12 is inputted to the network printer 10. This process is performed in response to a command issued by the control unit 21, according to the image processing program stored in the ROM 30.

The control unit 21 determines whether or not a color image 12 has been entered to the image processing unit 20 (S1). If a determination is made that a color image 12 has not been entered yet, the control unit 21 enters a standby state. If the determination is made that the color image 12 has been entered (S1: YES), the control unit 21 stores the color image 12 in a predetermined region of the RAM 31 (S2).

The control unit 21 generates a second gray-scale image 15 (see FIG. 2) based on the color image 12 (S3). The second gray-scale image 15 is obtained by representing the color image 12 only in terms of brightness. This means that the second gray-scale image 15 and the color image 12 have the same size (resolution). The second gray-scale image 15 is represented by pixels having a brightness value in the range of 0 to 255 (256 levels of tone). In Step S3, for example, the control unit 21 generates the second gray-scale image 15 by averaging the RGB values for each pixel contained in the color image 120. The averaged value is employed as the brightness value of each pixel in the color image 12. For example, if a given pixel contained in the color image 12 has RGB values of 240, 0, 0, the pixel in the second gray-scale image 15 corresponding to the given pixel, has a brightness value of 80. Note that the method of generating the second gray-scale image 15 is not limited to this method. In order to generate the second gray-scale image 15, for example, a color image 12 formed in the RGB color system may be converted into a color image in the YCrCb color system. In the YCrCb color system, the Y component is then extracted from the converted color image. Alternatively, the second gray-scale image 15 may be generated after the first gray-scale image 14 (to be described later) is generated.

The control unit 21 scales down the color image 12 to generate the scaled-down image 13 (see FIG. 2). The control unit 21 then generates the first gray-scale image 14 (see FIG. 2) based on the scaled-down image 13 (S4). Specifically, the control unit 21 scales down the color image 12 stored in the RAM 31, so as to generate the scaled-down image 13. The scaled-down image 13 is formed in the RGB color system, similarly to the color image 12. In order to scale down the color image 12, methods such as the nearest neighbor method, the bicubic convolution method, and the average-pixel method are available. In the nearest neighbor method, the value of the pixel nearest to the position within an original image, corresponding to the position of a given pixel within its target image, is sampled. The sampled pixel value is employed without change. In the bicubic convolution method, interpolation is performed using the pixels surrounding the position within an original image, corresponding to a given pixel within its target image. If a higher priority is given to processing speed than image quality, the nearest neighbor method is employed. If a higher priority is given to image quality than processing speed, the bicubic convolution method or the average-pixel method is employed.

The scaled-down image 13 is a color image to be displayed on the display unit 23 (see FIG. 9). The control unit 21, therefore, scales down the color image 12 to generate a scaled-down image 13 of VGA (Video Graphics Array) size, for example. Specifically, the control unit 21 generates a scaled-down image 13 having 640×480 dots. Note that any size (resolution) is applicable to the scaled-down image 13 as long as the size is available on the display unit 23. For example, Quarter Video Graphics Array (QVGA) size and Extended Graphics Array (XGA) size are available to the scaled-down image 13. Sizes other than these standards are also available to the scaled-down image 13.

In Step S4, the control unit 21 generates a first gray-scale image 14 based on the generated scaled-down image 13. The first gray-scale image 14 is obtained by representing the scaled-down image 13 only in terms of brightness. This means that the first gray-scale image 14 and the scaled-down image 13 have the same size (resolution). The control unit 21, for example, generates the first gray-scale image 14 by averaging the RGB values for each pixel contained in the scaled-down image 13. The averaged value is employed as the brightness value of each pixel in the scaled-down image 13. The first gray-scale image 14 is represented by pixels having a brightness value in the range of 0 to 255 (256 levels of tone). In order to generate the first gray-scale image 14, the scaled-down image 13 formed in the RGB color system may be converted into a color image in the YCrCb color system. In the YCrCb color system, the Y component is then extracted from the converted color image.

Next, the control unit 21 generates a histogram 18, based on the first gray-scale image 14 (S5). The histogram 18 shows the brightness distribution (pixel distribution with respect to a series of brightness ranges) in the first gray-scale image 14 (see FIG. 6 and FIG. 7). In this embodiment, 256 tones of brightness are divided in to a series of 16 brightness ranges. The control unit 21 determines the brightness of each pixel contained in the first gray-scale image 14. Each pixel has a brightness value in the range of 0 to 255. The control unit 21 counts the number of pixels included to each brightness range so as to form the histogram 18. In the embodiment, the control unit 21 sets 16 brightness ranges to analyze the first gray-scale image 14. In order to generate the histogram 18, the control unit 21 then classifies the brightness level of each pixel contained in the first gray-scale image 14 to the corresponding brightness range. As shown in FIGS. 6 and 7, pixels having a brightness value from 0 to 15 are included to the first brightness range. Pixels having a brightness value from 16 to 31 are then included to the second brightness range. Similarly, the pixel is included in the corresponding range of the brightness according to the brightness value. Each of the brightness ranges includes a series of 16 brightness values. Finally, pixels having a brightness value from 240 to 255 are included in the 16th brightness range. Note that the number of the brightness ranges to be set for the histogram 18 is not limited to 16. Any number (for example, 8) may be used.

The control unit 21 determines a first threshold value based on the histogram 18. The first threshold value is set as a threshold value for display (S6). In this case, the first threshold value defines the boundary between the following pixels contained in the color image 12: pixels having the ground color of the writing medium; and pixels having a color other than the ground color. The control unit 21 determines which brightness range has the largest number of pixels in the histogram 18. The control unit 21 then selects any one of the brightness values within the determined brightness range as the first threshold value. For the determination, the control unit 21 performs a comparison between the numbers of pixels contained in the respective brightness ranges. Considering the histogram 18 shown in FIG. 6 as an example, the control unit 21 determines that the 12th brightness range, which covers the values from 176 to 191, has the largest number of pixels. In this case, the control unit 21 employs any one of the values from 176 to 191 as the first threshold value. For example, the control unit 21 employs "176" as the first threshold value. Considering the histogram 18 shown in FIG. 7 as another example, the control unit 21 determines that the third brightness range which includes the values from 32 to 47 has the largest number of pixels. The control unit 21 then selects any one of the values from 32 to 47 as the first threshold value. For example, the control unit 21 selects "47" as the first threshold value. The first threshold value is stored in the RAM 31 as the threshold value for display. The threshold value for display is used for correcting the ground-color pixels contained in the scaled-down image 13.

The control unit 21 prompts the user to select one from an auto-determination mode, a whiteboard mode, and a blackboard mode (S7). For example, the control unit 21 displays the message "Select one mode" on the display unit 23. The control unit 21 then determines whether or not the user selects one mode from the above three modes through the console unit 22 (S8). The console unit 22 thus accepts the selected one of the auto-determination mode, the whiteboard mode, and the blackboard mode. The control unit 21 divides the histogram 18 into a dark part and a bright part. The dark part is the range from "0" level to "127" level. The bright part is the range from "128" level to "255" level. In the auto-determination mode, the control unit 21 determines whether the peak appears within the histogram 18 in the bright part or in the dark part. The whiteboard mode is that the peak is positioned in the bright part within the histogram 18, i.e., that the ground color contained in the color image 12 is similar to white. The blackboard mode is that the peak is positioned in the dark part within the histogram 18, i.e., that the ground color contained in the color image 12 is similar to black. If the control unit 21 determines that the selection information has not been entered yet (S8: NO), the process goes back to Step S7. If the determination is made that the selection information has been entered (S8: YES), the control unit 21 determines whether or not the auto-determination mode has been selected, according to the selection information (S9).

If the determination is made that auto-determination mode has been selected (S9: YES), the control unit 21 further determines whether the peak is positioned in the bright part or in the dark part of the histogram 18 (S10). Specifically, the control unit 21 determines whether the brightness range determined to have the largest number of pixels in Step S6 is positioned in the bright part or in the dark part. In other words, the control unit 21 determines whether the brightness range determined to have the largest number of pixels belongs to the group of the ninth-sixteenth brightness ranges or to the group of the first-eighth brightness ranges. If the color image 12 is obtained by photographing a whiteboard, the peak is usually positioned in the bright part (see FIG. 6). In this case, the determination is made that the pixel having the brightness value equal to or larger than the first threshold value is the ground-color pixels of the whiteboard. If the color image 12 is obtained by photographing a blackboard, the peak is positioned in the dark part (see FIG. 7). In this case, the determination is made that the pixel having the brightness value smaller than the first threshold value is the ground-color pixel of the blackboard.

If the control unit 21 determines that the peak of the histogram 18 is positioned in the bright part (S10: in the bright part), the process proceeds to Step S13 (see FIG. 4). For example, if the histogram 18 is given as shown in FIG. 6, the control unit 21 determines that the peak is positioned in the bright part. On the other hand, if the control unit 21 determines that the peak of the histogram 18 is positioned in the dark part (S10: in the dark part), the process proceeds to Step S24 (see FIG. 5). If the histogram 18 is given as shown in FIG. 7, the control unit 21 determines that the peak is positioned in the dark part.

If the determination is made that auto-determination mode has not been selected (S9: NO), the control unit 21 further determines which mode has been selected: the whiteboard mode or the blackboard mode (S11). If the control unit 21 determines that the whiteboard mode has been selected (S11: whiteboard), the process proceeds to Step S13. If the control unit 21 determines that the blackboard mode has been selected (S11: blackboard), the process proceeds to Step S24.

Figure 8A:
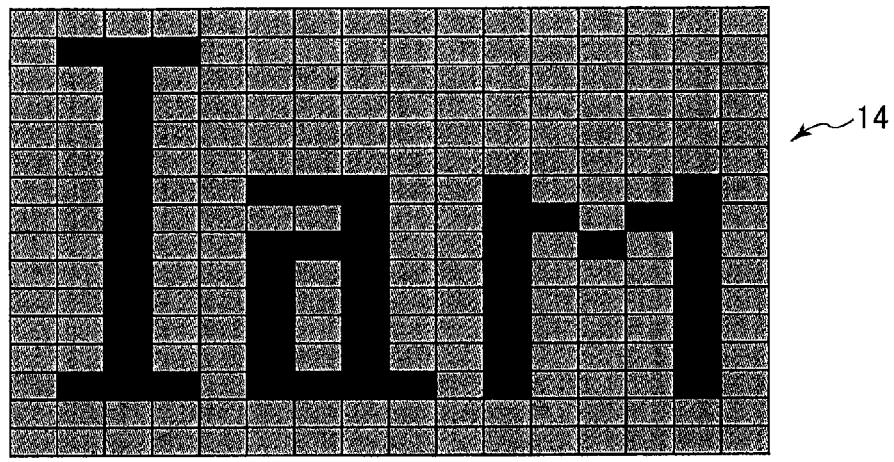
FIGS. 8A, 8B, and 8C illustrate a process for replacing a pixel having a ground color with a white pixel.
Figure 8B:
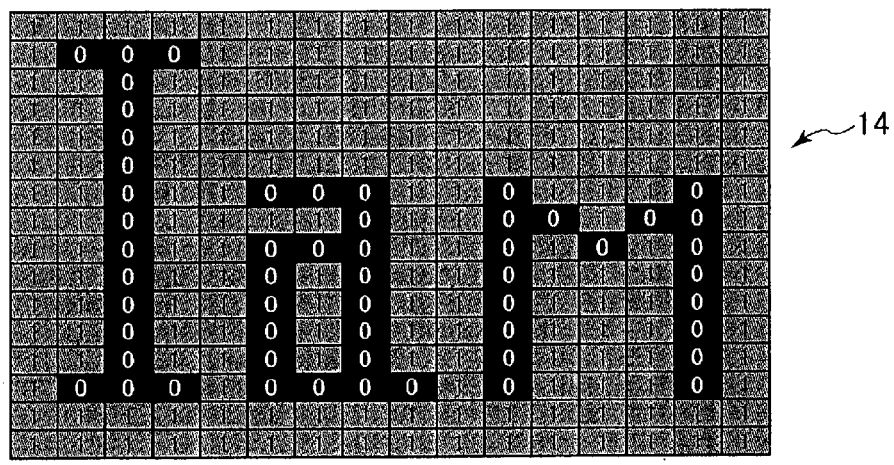

If the determination is made that the peak is positioned in the bright part in Step S10, or if the determination is made that the whiteboard mode has been selected in Step S11, the control unit 21 detects the pixel having the brightness value equal to or larger than the threshold value for display in the first gray-scale image 14, as the ground-color pixel of the whiteboard (S13). For example, if the brightness value "176" is set as the threshold value for display in the histogram 18 shown in FIG. 6, the control unit 21 detects the pixel included in the twelfth to sixteenth brightness ranges as the ground-color pixels. As shown in FIGS. 8A and 8B, the control unit 21 imparts the code "1" to the pixel having the brightness value equal to or larger than the threshold value for display. In addition, the control unit 21 imparts the code "0" to the pixel having the brightness value smaller than the threshold value for display In this way, the control unit 21 compares the brightness value of each pixel contained in the first gray-scale image 14 with the first threshold value so as to detect the ground-color pixels in the first gray-scale image 14. When the second threshold value (to be described later) has been entered from the console unit 22, the control unit 21 detects the ground-color pixel, based on the second threshold value instead of the first threshold value. In this case, specifically, the control unit 21 compares the brightness value of each pixel contained in the first gray-scale image 14 with the second threshold value so as to detect the ground-color pixel in the first gray-scale image 14.

Figure 8C:
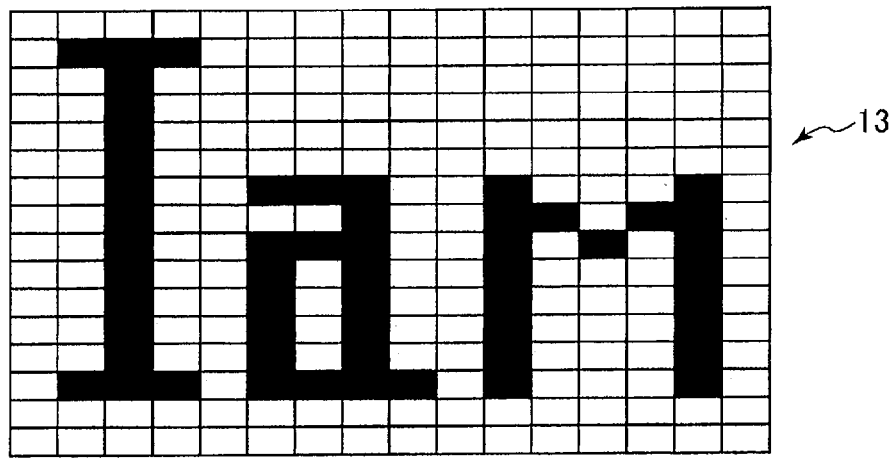

The first gray-scale image 14 and the scaled-down image 13 have the same size. This means that each pixel contained in the first gray-scale image 14 corresponds to each pixel contained in the scaled-down image 13. The control unit 21 replaces the pixel of the scaled-down image 13 detected as the ground-color pixel with a white pixel (S14). In this embodiment, the white pixel has pure white color whose RGB values are 255, 255, 255. Specifically, the control unit 21 replaces the pixel of the scaled-down image 13 to which the code "1" has been imparted with the white pixel (see FIGS. 8B and 8C). In this case, the "white pixel" is a pixel which has a predetermined color value representing a white color. The control unit 21 changes the RGB values of the corresponding pixels contained in the scaled-down image 13, for example, to 255, 255, 255. These operations enable the control unit 21 to replace the ground-color pixel contained in the scaled-down image 13 with the white pixel.

The control unit 21 displays information which prompts the user to select whether or not the scaled-down image 13 and the threshold value for display are to be changed (S15). Specifically, the control unit 21 displays the screen 42 shown in FIG. 9 on the display unit 23. The scaled-down image 13, the histogram 18, the change keys 47, and the enter key 45 are displayed on the screen 42. The scaled-down image 13 is produced in Step S14. It is in Step S5 that the histogram 18 has been generated. As shown in FIG. 9, the threshold value for display is visually indicated in the histogram 18. The change keys 47 are input keys provided on the console unit 22 for changing the threshold value for display. The enter key 45 is also an input key provided on the console unit 22 for setting the threshold value for display as a threshold value for printing. In this way, the display unit 23 displays the scaled-down image 13 in which the control unit 21 has replaced the ground-color pixels with white pixels.

The control unit 21 determines whether or not any information has been entered from the console unit 22 (s16). If the control unit 21 determines that no information has been entered yet (S16: NO), the process goes back to Step S15. If the control unit 21 determines that some information has been entered (S16: YES), the control unit 21 determines which kind of information has been entered: confirmation information (selection of the "enter" key) or a second threshold value (S17). In other words, the control unit 21 determines based on the information entered from the console unit 22 which key has been operated: the enter key 45 or any one of the change keys 47. If the determination is made that the second threshold value has been entered (S17: second threshold value), the control unit 21 changes the threshold value for display to the entered second threshold value (S18). If the first threshold value has been set as the threshold value for display, the first threshold value is changed to the second threshold value. When Step S18 is completed, the process returns to Step S13. Steps S13 to S15 are performed based on the threshold value for display which has been changed in Step S18. As a result, the screen 42 displays the scaled-down image 13 in which the ground-color pixel is replaced with the white pixel based on the changed threshold value for display (second threshold value).

As described above, the pixel of the scaled-down image 13 which is determined as the ground-color pixel is replaced with the white pixel. The display unit 23 displays the replacement result in the scaled-down image 13. These operations enable the user to look at the displayed scaled-down image 13 so as to check how the ground color of the color image 12 has been corrected. In addition, the user operates the change keys 47 to enter the second threshold value to the console unit 22. Next, the ground-color pixel is detected based on the second threshold value instead of the first threshold value. In the scaled-down image 13, the ground-color pixel detected based on the second threshold value is replaced with the white pixel. The corrected scaled-down image 13 is displayed on the display unit 23. Therefore, the user operates the change keys 47 to find an optimal threshold value, while the user determines the image quality of the scaled-down image 13 displayed on the screen 42.

If the control unit 21 determines that confirmation information has been entered (S17: confirmation information), the threshold value for display is set as a threshold value for printing (S19). If the user operates the enter key 45 without operating the change keys 47, the first threshold value which has been set as the threshold value for display in Step S6 is employed as the threshold value for printing. If the user operates one of the change keys 47 and the enter key 45, the second threshold value which has been set as the threshold value for display in Step S18 is employed as the threshold value for printing. In this case, the control unit 21 sets the second threshold value instead of the first threshold value which has been set in Step S6.

The control unit 21 detects the pixel having a brightness value equal to or larger than the threshold value for printing from the second gray-scale image 15, as the ground-color pixel (S20). In order to detect the ground-color pixel from the second gray-scale image 15, the control unit 21 compares the brightness value of each pixel contained in the second gray-scale image 15 with the threshold value for printing. The control unit 21 imparts the code "1" to the pixel having the brightness value equal to or larger than the threshold value for printing in the second gray-scale image 15. The control unit 21 also imparts the code "0" to the pixel having a brightness value smaller than the threshold value for printing in the second gray-scale image 15. In this way, if the control unit 21 determines that the peak is positioned in the bright part, i.e., if the selected whiteboard mode is selected, the control unit 21 detects the pixel having the brightness value equal to or larger than the threshold value for printing as the ground-color pixel.

The control unit 21 replaces the pixel of the second gray-scale image 15 which is determined as the ground color-pixel with the white pixel to generates a corrected image 16 (S21). In other words, in order to generate the corrected image 16, the control unit 21 replaces the ground-color pixel contained in the color image 12 with the white color pixel. Specifically, the control unit 21 replaces the pixel of the color image 12 with the white pixel. The pixel to be replaced corresponds to the pixel to which the code "1" has been imparted in the second gray-scale image 15. The control unit 21 changes the RGB values of pixels contained in the color image 12 to predetermined color values, for example, 255, 255, 255. The pixel to be changed corresponds to the pixel to which the code "1" has been imparted. The corrected image 16 is thus obtained by replacing the ground-color pixel of the color image 12 with the white pixel. The control unit 21 prints the corrected image 16 on a recording sheet using the printer unit 40 (S22).

As has been described above, in Step S20, the ground-color pixel is detected from the second gray-scale image 15 instead of the color image 12. However, the ground-color pixel contained in the color image 12 may be detected without using the second gray-scale image 15. For example, in Step S20, the control unit 21 obtains the brightness value of each pixel contained in the color image 12 by averaging the RGB values of each pixel. The control unit 21 then compares the obtained brightness value with the threshold value for printing. Based on the comparison result, the pixel having the brightness value equal to or larger than the threshold value for printing is detected from the color image 12 as the ground-color pixel. The control unit 21 then replaces the ground-color pixel which have been detected from the color image 12 with the white pixel in Step S21. In this case, Step S3 is not necessary.

If the determination is made that the peak of the histogram 18 is positioned in the dark part in Step S10, i.e., if the determination is made that blackboard mode has been selected in Step S11 the control unit 21 detects the pixel having the brightness value smaller than the threshold value for display as the ground-color pixel, as shown in FIG. 5 (S24). For example, if the value "47" is set as the threshold value for display for the histogram 18 shown in FIG. 7, the control unit 21 detects the pixels included in the first to third brightness ranges from the first gray-scale image 14. With respect to the first gray-scale image, the control unit 21 imparts the code "1" to the pixel having a brightness value smaller than the threshold value for display. The control unit 21 also imparts the code "0" to the pixel having the brightness value equal to the threshold value for display or larger at the same time. In this way, the control unit 21 compares the brightness value of each pixel contained in the first gray-scale image 14 with the first threshold value. The control unit 21 then detects the ground-color pixel from the first gray-scale image 14. When the second threshold value has been entered from the console unit 22, the control unit 21 detects the ground-color pixel based on the second threshold value instead of the first threshold value. In this case, specifically, the control unit 21 compares the brightness value of each pixel contained in the first gray-scale image 14 with the second threshold value to detect the ground-color pixel from the first gray-scale image 14.

The control unit 21 replaces the pixel of the scaled-down image 13 detected as the ground-color pixel with the white pixel (S25). Specifically, the control unit 21 replaces the pixel of the scaled-down image 13 corresponding to the pixel to which the code "1" has been imparted in the first gray-scale image 14 with the white pixel. The control unit 21 changes the RGB values of the corresponding pixels of the scaled-down image 13, for example, to 255, 255, 255. This allows the ground-color pixel contained in the scaled-down image 13 to be replaced with the white pixel.

The control unit 21 reverses the brightness values of the pixel having a color other than the ground color in the scaled-down image 13 (S26). Specifically, the control unit 21 reverses the brightness values of the pixels contained in the scaled-down image 13, corresponding to the pixels to which the code "0" is imparted in the first gray-scale image 14. For example, the RGB values of the pixel contained in the scaled-down image 13 are 0, 255, and 5, the control unit 21 changes the RGB values to 255, 0, and 250 to reverse the brightness values.

The control unit 21 displays information which prompts the user to select whether or not a change is made to the scaled-down image 13 after Step S25 and Step S26, and made to the threshold value for display (S27). The display unit 23 displays the screen 42 under the control of the control unit 21. Step S27 is performed, similarly to Step S15. Therefore, a detailed description of Step S27 is omitted here.

The control unit 21 determines whether or not any information has been entered from the console unit 22, similarly to Step S16 (S28). If the control unit 21 determines that no information has been entered yet, (S28; NO), the process goes back to Step S27. If the control unit 21 determines that some information has been entered (S28: YES), the control unit 21 again determines which kind of information has been entered, similarly to Step S17: confirmation information or the second threshold value (S29). If the determination is made that the second threshold value has been entered (S29: second threshold value), the control unit 21 changes the threshold value for display to the second threshold value (S30). If the first threshold value has been set as the threshold value for display, the first threshold value is changed to the second threshold value. As the Step S30 is completed, the process returns to Step S24. Steps S24 to S27 are performed based on the threshold value for display which has been changed in Step S24. As a result, the screen 42 displays the scaled-down image 13. In the scaled-down image 13, based on the changed threshold value for display (second threshold value), the ground-color pixel is replaced with the white pixel, and the brightness values of the pixel having a color other than the ground color are reversed.

If the control unit 21 determines that confirmation information has been entered (S29: confirmation information), the threshold value for display is set as a threshold value for printing (S31). If the user operates the enter key 45 without operating the change keys 47, the first threshold value, which has been set as the threshold value for display in Step S6, is employed as the threshold value for printing. If the user operates one of the change keys 47 and then enters the enter key 45, the second threshold value which has been set as the threshold value for display in Step S30 is employed as the threshold value for printing. Specifically, the first threshold value is changed to the second threshold value.

The control unit 21 detects the pixel having a brightness value smaller than the threshold value for printing, from the second gray-scale image 15, as the ground-color pixels (S32). In order to detect the ground-color pixel from the second gray-scale image 15, the control unit 21 compares the brightness value of each pixel contained in the second gray-scale image 15 with the threshold value for printing. The control unit 21 imparts the code "1" to the pixel having the brightness value smaller than the threshold value for printing in the second gray-scale image 15. The control unit 21 also imparts the code "0" to the pixel having the brightness value equal to or larger than the threshold value for printing in the second gray-scale image 15. In this way, when the control unit 21 determines that the peak is positioned in the dark part, or when the blackboard mode is selected, the control unit 21 detects the pixel having a brightness value smaller than the threshold value for printing as the ground-color pixels.

The control unit 21 generates a corrected image 16. The corrected image 16 is generated by replacing the pixel of the color image 12 with the white pixel. The pixel to be replaced correspond to the ground-color pixel, which have been detected from the second gray-scale image 15. In the corrected image 16, the brightness value of the pixel having a color other than the ground color is reversed (S33). The control unit 21 replaces the ground-color pixel contained in the color image 12 with the pixel which has white color. The control unit 21 replaces the pixel of the color image 12 with the white pixel. The pixel to be replaced corresponds to the pixel to which the code "1" has been imparted in the second gray-scale image 15. For example, the control unit 21 changes the RGB values of the pixel contained in the color image 12 to the values, for example, 255, 255, and 255. The pixel to be changed corresponds to the pixel to which the code "1" has been imparted. Furthermore, the control unit 21 reverses the brightness values of pixels contained in the color image 12. The pixel to be reversed correspond to the pixel to which the code "0" has been imparted in the second gray-scale image 15. For example, if the RGB values of the pixel contained in the color image 12 are 0, 255, and 5, the control unit 21 changes the RGB values to 255, 0, and 250. Thus, the brightness values of the pixel having the color other than the ground color in the color image 12 are reversed. Through these steps, the ground-color pixel in the color image 12 is replaced with the white pixel. Also, the corrected image 16 is generated in which the brightness values of the pixel having the color other than the ground color are reversed. The corrected image 16 which has been generated in Step S33 is printed on a recording sheet by the printer unit 40 (S22).

In Step S32, the ground-color pixel may be detected from the color image 12 without employing the second gray-scale image 15. For example, in Step S32, the control unit 21 obtains the brightness value of each pixel contained in the color image 12 by averaging the RGB values of each pixel. The control unit 21 then compares the obtained brightness value with the threshold value for printing. Based on the comparison result, the pixel having the brightness value smaller than the threshold value for printing is detected as the ground-color pixel. In this way, the control unit 21 replaces the ground-color pixel detected from the color image 12, with the white pixel in Step S33.

As has been described above, the ground-color pixel detected from the color image 12 is replaced with the pixel having uniform white color (white pixel). This fixes a clear boundary between the ground color and any color other than the ground color in the color image 12. The increased visibility for the image 12 is thus obtained by printing the corrected image 16 with the printer unit 40.

In addition, a large number of the ground-color pixels contained in the color image 12 are replaced with the white color pixels. The color image 12 is obtained by photographing a whiteboard, and the photographed whiteboard image is then entered to the network printer 10. The ground color of the whiteboard without characters nor a graphic thereon is not purely white due to dust or dirt adhering to the surface of the whiteboard. The ground color of the whiteboard is changed to the white color. On the other hand, another color image 12 is obtained by photographing a blackboard, and the photographed blackboard image is then transferred to the network printer 10. Characters and/or a graphic have been written on the blackboard in white. The ground color of the blackboard, provided that neither characters nor a graphic has been written on the blackboard, is typically a dark green, near black. In this case, the blackboard ground color is changed to white. At the same time, the color of the characters and/or the graphic is changed from white to black. Since the ground color is changed to the white color regardless of whether a whiteboard or a blackboard, the amount of ink or toner required for printing the color image 12 can be reduced. This is an advantage if the ground color is nearly black, for example, when a blackboard is employed.

Furthermore, the color image 12 is obtained by photographing a whiteboard, and the photographed whiteboard image is then transferred to the network printer 10. Characters and/or a graphic have been written on the whiteboard. In this case, the user selects whiteboard mode so that the ground-color pixel of the whiteboard are replaced with the white pixel having white color.

On the other hand, another color image 12 is obtained by photographing a blackboard. The photographed blackboard image is then transferred to the network printer 10. Characters and/or a graphic have been written on the blackboard. In this case, the user selects blackboard mode so that the ground-color pixel of the blackboard is replaced with the white pixel. The user thus selects an appropriate mode according to the ground color of the color image 12. The ground-color pixel is changed to the white pixel having white color regardless of ground color.

The user specifies the second threshold value arbitrarily. Based on the second threshold value, the ground-color pixel of the color image 12 is detected. The detected pixel is replaced with the white pixel. Since color correction is performed based on the second threshold value specified by the user, the user can obtain the image having the corrected ground-color which is suitable for the user's convenience.

The image forming apparatus according to the present invention is not limited to the network printer 10. The present invention is applied to any device having a printing function. Specifically, the present invention is applicable to devices including a copier and a multi-function printer serving as a scanner, a copier, a printer, and/or a facsimile machine.

It is understood that the foregoing description and accompanying drawings set forth the embodiments of the invention at the present time, Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An image processing device comprising:
 a storage unit that stores a color image having ground color and different color from the ground color, the color image being formed by color-pixels including a ground color pixel and a different color pixel, the ground color pixel having the ground color, the different color pixel having the different color;
 a first processing unit that produces a first gray-scale image from the color image, the first gray-scale image having fewer pixels when compared to the color image and is represented by brightness having a plurality of brightness values, the first gray-scale image being formed by first gray-scale pixels;

a second processing unit that produces a histogram of the first gray-scale image, the histogram showing a distribution of the color pixels with respect to the brightness;

a first determination unit that determines a first threshold level of the brightness based on the histogram; and a first replacement unit that compares a brightness value of at least one of the color pixels with the first threshold level to detect the ground color pixel and replaces the detected ground color pixel with a white color pixel to produce a processed color image, the white color pixel having white color.

2. The image processing device according to claim 1, wherein the second processing unit divides the plurality of brightness values into a series of brightness ranges, and sorts each of the first gray-scale pixels to a corresponding brightness range based on the brightness value thereof for producing the histogram, the first determination unit selects the brightness range having a largest number of first gray-scale pixels and sets a brightness value within the selected brightness range as the first threshold level.

3. The image processing device according to claim 1, further comprising a third processing unit that directly produces a second gray-scale image from the color image without scaling down, the second gray-scale image being represented by the brightness, the second gray-scale image being formed by the second gray-scale pixels, wherein the first replacement unit that compares the brightness value of at least one of the second gray-scale pixels with the first threshold level to detect the ground color pixel and replace the detected ground color pixel with the white color pixel.

4. The image processing device according to claim 1, wherein the histogram is divided into a dark part and a bright part, the dark part including a darkest brightness value, the bright part including a brightest brightness value, further comprising:

a second determination unit that finds a peak of the histogram and determines whether the peak is included in the dark part or in the bright part, wherein the first replacement unit selects the color pixel having the brightness value less than the first threshold level, as the ground color pixel, if the peak is in the dark part, and the first replacement unit selects the color pixel having the brightness value more than the first threshold level, as the ground color pixel, if the peak is in the bright part.

5. The image processing device according to claim 4, wherein the first replacement unit selects the color pixel having the brightness value more than the first threshold level and reverse the brightness value of the selected color pixel, if the peak is in the dark part.

6. The image processing device according to claim 1, further comprising:

a first selection unit for selecting one of a first mode or a second mode, the first mode being for the color image having the peak of the histogram in the bright part, the second mode being for the color image having the peak of the histogram in the dark part, wherein the first replacement unit detects the color pixel having the brightness value more than the first threshold level as the ground color pixel, if the first mode is selected, and the first replacement unit detects the color pixel having the brightness value less than the first threshold level, as the ground color pixel, if the second mode is selected.

7. The image processing device according to claim 6, wherein the first replacement unit selects the color pixel having the brightness value more than the first threshold level, and reverses the brightness value of the selected color pixel, if the second mode is selected.

8. An image processing device according to claim 1, wherein the first processing unit scales down the color image to produce a scaled-down color image for producing the first gray-scale image, the scaled-down color image being formed by scaled-down color pixels, the image processing device further comprising:

a second replacement unit that compares a brightness value of one of the scaled-down color pixels with the first threshold level to detect the ground color pixel and replaces the detected ground color pixel with the white color pixel to produce a display image; and a display unit that displays the display image.

9. The image processing device according to claim 8, further comprising an entry unit that receives a second threshold level different from the first threshold level, wherein the second replacement unit detects the ground color pixel, based on the second threshold level instead of the first threshold level.

10. The image processing device according to claim 9, wherein the first replacement unit compares the brightness value of each of the color pixels with the second threshold level to detect the ground color pixel.

11. An image-forming apparatus, comprising:

the image processing device according to claim 1; and a print unit that prints the color image processed by the image processing device.

12. A non-transitory storage medium storing a set of program instructions executable on a data processing device and usable for print, instructions comprising:

storing a color image having ground color and different color from the ground color, the color image being formed by color pixels including a ground color pixel and a different color pixel, the ground color pixel having the ground color, the different color pixel having the different color;

producing a first gray-scale image from the color image, the first gray-scale image having fewer pixels when compared to the color image and is represented by brightness having a plurality of brightness values, the first gray-scale image being formed by first gray-scale pixels;

producing a histogram of the first gray-scale image, the histogram showing a distribution of the color pixels with respect to the brightness;

determining a first threshold level of the brightness according to the histogram; and comparing a brightness value of at least one of the color pixels with the first threshold level to detect the ground color pixel, and replacing the detected ground color pixel with a white color pixel to produce a processed color image, the white color pixel having white color.

13. A method for processing a color image having ground color and different color from the ground color, the color image being formed by color pixels including a ground color pixel and a different color pixel, the ground color pixel having the ground color, the different color pixel having the different color, comprising:

storing the color image;

producing a first gray-scale image from the color image, the first gray-scale image having fewer pixels when compared to the color image and is represented by brightness having a plurality of brightness values, the first gray-scale image being formed by first gray-scale pixels;
producing a histogram of the first gray-scale image, the histogram showing a distribution of the color pixels with respect to the brightness;
determining a first threshold level of the brightness according to the histogram; and
comparing a brightness value of at least one of the color pixels with the first threshold level to detect the ground color pixel, and replacing the detected ground color pixel with a white color pixel to produce a processed color image, the white color pixel having white color.

* * * * *